United States Patent [19]
Lamb

[11] 4,033,618
[45] July 5, 1977

[54] TERRARIUM PLANTING IMPLEMENT

[76] Inventor: Gerald P. Lamb, 2648 Hartford St., San Diego, Calif. 92110

[22] Filed: June 7, 1976

[21] Appl. No.: 693,530

[52] U.S. Cl. .............................. 294/19 R; 294/104
[51] Int. Cl.² ...................... A01G 3/00; B25B 7/14
[58] Field of Search ................ 294/19 R–24, 294/50.5–53.5, 99 R, 100, 104, 115; 15/104.3 SN; 47/58; 81/177 F; 111/4; 128/303 R, 321

[56] References Cited
UNITED STATES PATENTS

| | | | |
|---|---|---|---|
| 548,348 | 10/1895 | Biddell | 294/52 |
| 801,902 | 10/1905 | Olafson | 294/21 |
| 1,133,613 | 3/1915 | Buss et al. | 294/20 |
| 1,519,938 | 12/1924 | Smith | 294/104 X |
| 2,212,013 | 8/1940 | Devareaux | 294/100 |
| 2,320,967 | 6/1943 | Dunkelberger | 294/100 |
| 2,595,134 | 4/1952 | Gordon | 294/19 R X |
| 3,146,015 | 8/1964 | Roberge | 294/19 R |
| 3,907,354 | 9/1975 | Ocampo | 294/19 R |

OTHER PUBLICATIONS
"Terrariums", Horticulture, Oct. 1975, pp. 44–51 by Benny Tjia.

*Primary Examiner*—Johnny D. Cherry
*Attorney, Agent, or Firm*—Frank D. Gilliam

[57] ABSTRACT

A planting implement for a terrarium having a narrow access to the planting area. The implement has an elongated body member. The upper portion of the body member is rigid and forms the handle of the device. The lower portion is flexible and positioned normally co-axial with the upper portion. A normally closed jaw type plant holder is attached to the free end of the lower flexible portion. A first actuator is provided for manipulating the plant holder to any desired location of the planting area. A second actuator is provided for selectively opening the jaws of the plant holder. Both of the actuators are positioned external of the narrow terrarium access and are near the handle of the rigid portion. There are additionally included slide-on attachments for planting area preparation and beautification.

9 Claims, 4 Drawing Figures

U.S. Patent   July 5, 1977   4,033,618
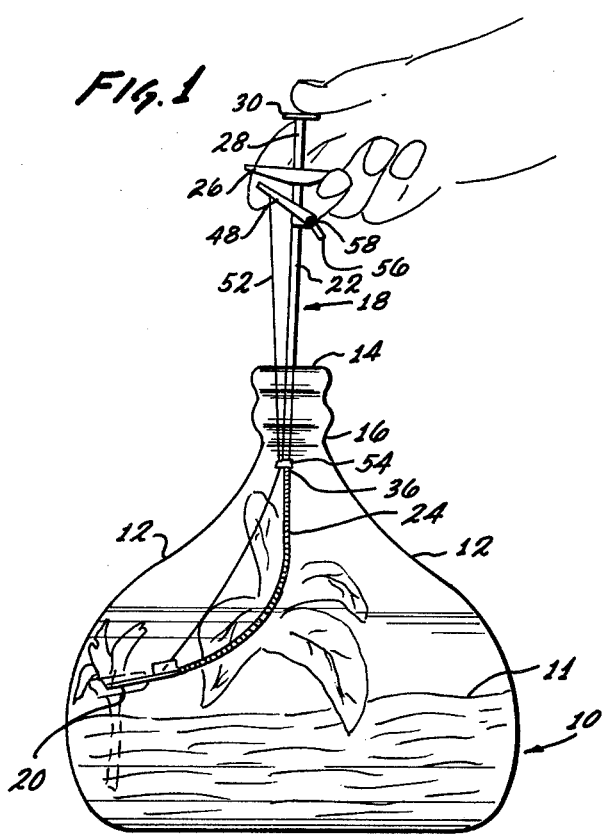
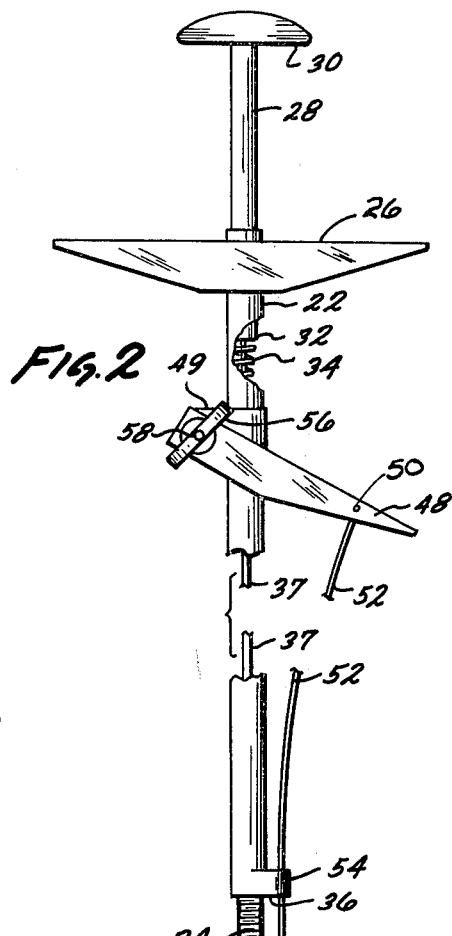
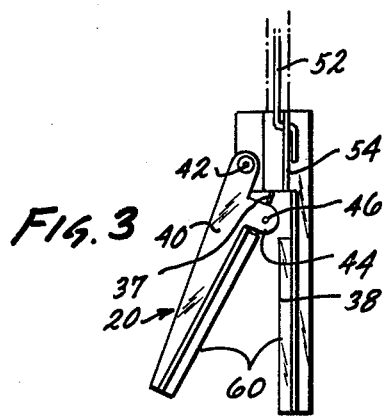
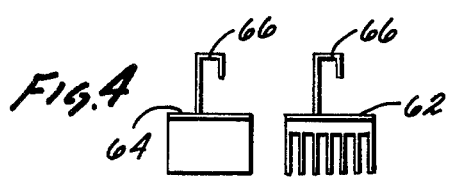
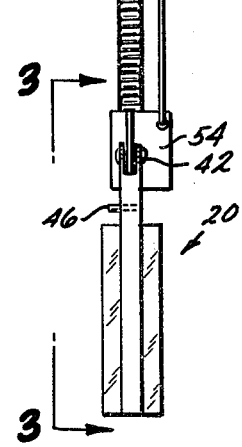

TERRARIUM PLANTING IMPLEMENT

BACKGROUND OF THE INVENTION

The invention generally relates to planting implements and more specifically to an improved manipulatable planting implement for use in planting terrariums having normally inaccessible planting areas.

Various weeding, planting and transplanting implements have been proposed. Some examples of these devices can be found in U.S. Pat. Nos. 182,367; 594,304; 1,053,730; 1,860,963 and 1,970,108. All of these and similar existing devices are designed for readily accessible planting areas co-axial with the device. Some teach releasable plant holding means.

U.S. Pat. No. 2,374,582 teaches a remotely operable plant holding and releasing means but does not teach a remotely operable plant holder positioning means but rather a fixedly positioned plant positioning means that is positionable by trial and error by repeatedly removing and inserting the device until the proper positioning is obtained. In some type terrariums, where the opening to the plant area is long and narrow, such as a jug, the prepositioned plant holding means cannot be inserted at all.

SUMMARY AND OBJECTS OF THE INVENTION

The instant terrarium planting implement is an advancement of the prior art discussed above. The device provides a means for the planting of terrariums of modern design that are provided with only a small, elongated access opening to the inside plant area. The instant device allows the operator to grip a plant within the jaws of the plant holding means, insert the plant through the opening, position the plant in the desired location in the terrarium planting area, release the plant from the holder, allowing the holder to return to its normal position co-axial with the handle and then remove the device from the terrarium. All of these functions are performed at the handle of the device external of the terrarium planting area.

It is the primary object of this invention to provide a terrarium planting implement having complete manipulation control remote of the area being planted.

Another object of the invention is to lock the plant holding means in a position desired for depositing the plant in the terrarium.

A further object of the invention is to provide attachments for planting area preparation and beautification.

The foregoing and various other features and objects of the invention will appear in the course of the description which is rendered below with reference to the accompanying drawings wherein the same reference numerals depict the identical element or part.

BRIEF DESCRIPTION OF THE DRAWINGS

FIG. 1 shows a terrarium with a small access to the planting area with the implement in one position of operation;

FIG. 2 shows a perspective partial cutaway showing of the implement;

FIG. 3 shows a portion of FIG. 2, taken along lines 3—3; and

FIG. 4 shows attachments for the device.

DETAILED DESCRIPTION OF THE PREFERRED EMBODIMENT

The invention relates to a device for planting, transplanting and preparing the planting surface of a terrarium planter having a small elongated access opening and having a shape, such as, but not limited to, a large bottle or flask.

Referring now specifically to FIG. 1, a terrarium type planter 10 is shown. The planter 10 may take the shape of a flask or jug with the planting area 11 surrounded by walls 12 and having only a small central opening 14 at the upper end of a neck 16. Various growing plants are shown adjacent the planting area 11. The planting implement 18 is shown inserted through the central opening 14 and extending to a desired position within the terrarium. The plant holding jaws 20 are shown with a plant secured therebetween in the process of being planted therein. The planting implement 18 has an upper handle portion 22. This portion 22 is rigid and resistive to bending. The lower portion 24 of the device adjacent the handle is flexible as shown by its FIG. 1 configuration. The flexible portion is in the form of a wound coil of resilient material, such as, but not limited to spring steel and the like. This type of wound coil is commonly employed in flexible speedometer cables, brake cables for motorcycles and the like.

Referring now to FIGS. 1, 2 and 3, the rigid portion 22 has a handle 26 rigidly attached to the free end thereof. The rigid portion 22 is tubular or hollow and has a plunger member 28 slideably engaged therein, extending beyond the free end and handle. The end of the plunger 28 includes an actuating button 30 hereinafter discussed. The inner end 32 of the plunger 28 confines the upper surface of the coil spring 34. The other end of the spring 34 is confined by the end 36 of the rigid portion 22 adjacent its attachment with the flexible portion 24. A non-compressible rigid wire member 37 generally formed from spring steel or the like is fixedly secured to the plunger member 28 at inner end 32 and extends through the remainder of the rigid portion and all of the flexible portion.

The plant holding jaws 20 comprise a jaw 38 fixedly attached to the free end of the flexible portion 24 and the pivotable jaw 40 pivoted about pivot pin 42 secured to jaw 38. The tab 44 of jaw 40 is pivotably attached at 46 to the other end of wire 37.

Beneath handle 26 and above end 36 of the rigid portion is a lever 48 pivotally attached through a bracket 49 to the rigid portion 22 near one of its ends. Intermediate the ends of the lever 48, at location 50, is a rigid wire 52, similar in construction and performing a similar function as wire 37. Wire 52 passes through a guide 54 attached and fixedly positioned to end 36 of the rigid portion 22 and is pivotally attached at its other end to the fixedly positioned jaw 38 at one side of upper portion 54.

The lever 48 is provided with a lock actuated by tightening wing nut 56 on threaded bolt 58. Other types of locking means may be utilized, such as, a ratchet type, not shown.

The inner surface of the jaws 38, 40 are provided with soft resilient material 60, such as, but not limited to foam rubber.

Referring now to FIG. 4, a rake 62 and a hoe 64 are provided for preparing and beautifying the planting area 11. The rake and hoe fit onto jaw 38 by openings 66. The openings are slightly smaller than the outer surface of jaw 38 to secure the attachments to the jaw by means of friction.

OPERATION OF THE PREFERRED EMBODIMENT

As can be readily understood, the spring 32, being compressed between its stops, causes the plunger 28 to be elevated, as shown, and the jaws 38, 40 to be placed in a closed plant holding position, see FIG. 1. It should be further understood that when lock is in its released position, the flexible portion 24 acts as a spring to keep the portions 22, 24 in co-axial alignment.

To hold a plant between jaws 38, 40, button 30 is pressed downward forcing wire 37 to in turn force its attachment point 46 downward rotating jaw 40 to an open position. The plant is placed between the jaws 38, 40 and button 30 is released causing the jaws to snugly grip the plant.

The plant and flexible portion 24 are then inserted through opening 14 of neck 16 of the terrarium 10. When the plant is in at an approximate desired vertical position, lever 48 is operated upward, pulling wire 52 attached to fixedly positioned jaw 38. The lever is pulled until the plant holding jaws 20 are pulled upward so that they extend outward to a desired position, see FIG. 1. When the plant is in its proper selected location, already prepared for receiving the plant, plunger 30 is depressed releasing the plant. If any length of time is contemplated for the positioning and planting action, the nut 56 may be tightened on screw 58 to hold the lever 48 in a pre-selected position until the plant is deposited. The lock is then released letting the plant holding means return to its normal co-axial position.

This operation is continued until the terrarium is planted as desired. obviously, the rake and hoe attachments are utilized to prepare for planting and ensuring root coverage when the planting is complete.

It will be understood that changes and modifications may be made to the structure described without departing from the spirit and scope of the invention as set forth in the claims appended hereto.

Having thus described the invention, what is claimed as new and useful and desired to be secured by United States Letters Patent is:

1. A terrarium planting implement comprising:
   an elongated body member having a rigid and a flexible portion, the portions being substantially co-axial;
   a handle member fixedly attached to said rigid portion;
   a holding means attached to said flexible portion;
   a first actuating means positioned remote from said flexible portion and moveable relative to said portions for selectively releasing said holding means; and
   a second actuating means attached to said rigid portion for moving said holding means selectively between a position of substantially co-axial relationship with said rigid portion and a position of non-co-axial relationship with said rigid portion, said second actuating means comprising a lever member pivotally attached at one end to said rigid portion, an elongated actuating member pivotally attached at one end to said lever member intermediate the ends thereof and pivotally attached to said flexible portion at its other end, said elongated actuating member passing through a guide member attached to said rigid portion.

2. The invention as defined in claim 1, wherein there is additionally provided a second holding means for selectively holding at least a portion of said flexible portion in said non co-axial relationship.

3. The invention as defined in claim 1, wherein said elongated body member is tubular.

4. The invention as defined in claim 3, wherein said holding means comprises a rigid jaw and a pivotable jaw, said rigid jaw is attached to said flexible portion, and said pivotable jaw is attached to said rigid jaw.

5. The invention as defined in claim 4, wherein the inner surface of said jaws are lined with resilient material.

6. The invention as defined in claim 4, wherein said first actuating means comprises an elongated actuating member extending through the tubular member of said elongated body member having a second handle at one end extending beyond said rigid portion and a pivotal attachment to said pivotable jaw at its opposite end.

7. The invention as defined in claim 1, wherein said holding means is biased to a closed position.

8. The invention as defined in claim 1, wherein there are additionally provided implements for grooming the terrarium, said implements being removeably attachable to said holding means.

9. The invention as defined in claim 8, wherein said implements for grooming comprise a hoe and a rake.

* * * * *